(12) United States Patent
Ingram et al.

(10) Patent No.: US 9,588,002 B2
(45) Date of Patent: Mar. 7, 2017

(54) MEASUREMENT SENSOR

(71) Applicant: Silent Sensors Limited, London (GB)

(72) Inventors: Jonathan Ingram, Sherfield English (GB); Ashley Duddle, Fareham (GB); Marcus Taylor, Oakley (GB)

(73) Assignee: Silent Sensors Limited, London (GB)

( * ) Notice: Subject to any disclaimer, the term of this patent is extended or adjusted under 35 U.S.C. 154(b) by 88 days.

(21) Appl. No.: 14/367,693

(22) PCT Filed: Dec. 20, 2012

(86) PCT No.: PCT/GB2012/053208
§ 371 (c)(1),
(2) Date: Jun. 20, 2014

(87) PCT Pub. No.: WO2013/093476
PCT Pub. Date: Jun. 27, 2013

(65) Prior Publication Data
US 2015/0059461 A1    Mar. 5, 2015

(30) Foreign Application Priority Data

Dec. 20, 2011    (GB) .................................. 1121916.9

(51) Int. Cl.
*B60C 23/02*    (2006.01)
*G01L 17/00*    (2006.01)
(Continued)

(52) U.S. Cl.
CPC .............. *G01L 17/00* (2013.01); *B60C 23/04* (2013.01); *B60C 23/0449* (2013.01); *G01L 9/10* (2013.01); *G01L 9/12* (2013.01)

(58) Field of Classification Search
None
See application file for complete search history.

(56) References Cited

U.S. PATENT DOCUMENTS 7,038,470 B1    5/2006  Johnson
7,123,129 B1   10/2006  Schrott
(Continued)

FOREIGN PATENT DOCUMENTS

EP    1849629 A2   10/2007
GB    2486786       6/2012
(Continued)

OTHER PUBLICATIONS

International Search Report dated Jun. 27, 2013, for corresponding International Application No. PCT/GB2012/053208.
(Continued)

*Primary Examiner* — Andre Allen
(74) *Attorney, Agent, or Firm* — Quine Intellectual Property Law Group P.C.

(57) ABSTRACT

This invention is directed to a measurement sensor comprising a radio frequency identification circuit for measuring a parameter. The circuit comprises at least of one component in which a characteristic of that component can be changed to reflect a change in a measured parameter, such that the frequency of the sensor varies according to changes in the measured parameter. The invention extends to a system for measuring a variable parameter that incorporates such a sensor.

13 Claims, 1 Drawing Sheet

(51) Int. Cl.
*B60C 23/04* (2006.01)
*G01L 9/10* (2006.01)
*G01L 9/12* (2006.01)

(56) References Cited

U.S. PATENT DOCUMENTS

| | | | |
|---|---|---|---|
| 7,948,365 B2* | 5/2011 | Sekizawa | B60C 23/0416 340/442 |
| 2002/0092345 A1* | 7/2002 | Van Niekerk | G01M 17/02 73/146 |
| 2002/0092346 A1* | 7/2002 | Niekerk | B60C 23/0425 73/146.2 |
| 2002/0092347 A1* | 7/2002 | Niekerk | B60C 23/009 73/146.2 |
| 2003/0080862 A1* | 5/2003 | Kranz | B60C 23/0408 340/442 |
| 2003/0234722 A1 | 12/2003 | Lonsdale et al. | |
| 2005/0150286 A1 | 7/2005 | Kurtz et al. | |
| 2005/0253697 A1 | 11/2005 | Taguchi | |
| 2006/0290484 A1 | 12/2006 | Bauchot et al. | |
| 2007/0222590 A1 | 9/2007 | Posamentier | |
| 2008/0042819 A1* | 2/2008 | Masudaya | B60C 23/0449 340/447 |
| 2008/0278288 A1 | 11/2008 | O'Brien | |
| 2009/0058625 A1* | 3/2009 | Suzuki | B60C 23/041 340/447 |
| 2009/0184815 A1 | 7/2009 | Suzuki et al. | |
| 2010/0134269 A1* | 6/2010 | Zhu | B60C 23/041 340/447 |

FOREIGN PATENT DOCUMENTS

| | | |
|---|---|---|
| KR | 20100005848 | 7/2011 |
| WO | 2013/063181 | 9/2007 |
| WO | 2008/025779 | 3/2008 |
| WO | 2012/140310 | 10/2012 |

OTHER PUBLICATIONS

Search Report for GB1521582.5 from United Kingdom Intellectual Property Office, dated Jan. 7, 2016.
Search Report for GB1121916.9 from United Kingdom Intellectual Property Office, dated Jun. 11, 2013.

\* cited by examiner

MEASUREMENT SENSOR

RELATED APPLICATIONS

This application claims benefit and priority to UK patent application A Measurement Sensor, GB 1121916.9, filed Dec. 20, 2011; and to PCT application PCT/GB2012/053208, filed Dec. 20, 2012 (published as WO2013/093476), which are incorporated in their entirety herein for all purposes.

FIELD OF THE INVENTION

This invention relates to a measurement sensor.

BACKGROUND TO THE INVENTION

Systems for measuring variable parameters are often expensive and bulky. Additionally, they often rely upon a power source, usually in the form of batteries, which may need frequent recharging in order to keep the circuits powered. Where the devices need to be small, for example where tyre pressures are monitored, such systems may be difficult to access, thereby making changing of the power source a potentially expensive and difficult task; disposal and safety issues relating to batteries can also be a major issue.

Radio frequency identification (RFID) tags and readers are used in shops for reducing theft. The tags are attached to products and readers are located by the doors to the shop, with the tags triggering an alarm should they not be deactivated before passing the reader.

Such tags contain no power source and rely upon 'activation' via electromagnetic induction from the reader in order to power the circuit contained within the tags.

The operating frequencies, also referred to as their nominal centre frequency or an associated sideband frequency, are, generally, not tightly controlled, as the readers can accommodate variations in operating frequencies. Traditionally, the reader may rely upon a range of frequencies in order to locate the tag.

SUMMARY OF THE INVENTION

Accordingly, the present invention is directed to a measurement sensor comprising a radio frequency identification circuit for measuring a parameter, wherein the circuit comprises at least one component in which a characteristic of that component can be changed to reflect a change in a measured parameter, such that a frequency used by the sensor to communicate with a reader varies according to changes in the measured parameter.

The present invention takes advantage of RFID systems by deliberately and accurately modifying an operating frequency of the tag (centre frequency or otherwise) as a function of an external parameter to be measured, using techniques that do not affect the fundamental operation of the system. By having the frequency output of the device dependent upon a variable characteristic of a component of the RFID circuit, a deliberate and intentional change in that characteristic can result in a change in the signal transmitted from the RFID circuit. The system uses a component which can vary in a measurable characteristic as a function of the parameter to be measured. This allows one to create a passive RFID tag that is able to transmit information on the variable parameter, when interrogated by a reader, with the information being a 'real-time' indication of that parameter. The frequency is tightly controlled to provide a variation in the frequency that corresponds to a particular measurable parameter.

Variations in the tag operating frequency, as controlled by the key frequency determining component, is detected by the reader in addition to any other read or write operations. The reader uses a transfer function, or similar to convert the measured frequency into the value of the parameter being measured. This measurement can take place at any stage of the tag read write process. It is normal for there to be periods during system operation where there are settling times or where pre-amble or training sequences are sent which may be appropriate.

The ability of the tag to store data from the reader and for that data to be read by the reader during normal operation allows the tag to be programmed with calibration and other data at manufacture or normal operation to improve system performance, reliability and functionality. For example, if a capacitor were used to measure an external parameter, the variation in frequency with the change in that capacitance value could be programmed into the tag in the form of look-up tables, or more sophisticated transfer functions.

Preferably, the variable component of the circuit is a tuned resonant element. By tuning a resonant element within the circuit, the frequency that is transmitted by the tag can be used to provide information on the measured parameter.

Advantageously, the variable component of the circuit is selected from a group comprising: a capacitor; and a coil, which could comprise lumped or discrete components. A capacitor, which can change its capacitance as a result of detected pressure or force may be employed. Alternatively, or additionally, a coil which can vary in inductance as a function of length or acceleration may be used in tuned antenna systems. Suitable and simple devices are readily available with parameters that vary as a function of their environment, either deliberately, for example pressure sensitive capacitors, especially microelectromechanical devices, or as a side effect in standard devices, for example, the natural variation in size and inductance of coils with temperature or mechanical deflection.

It is preferable that the characteristic that changes according to the measured parameter is selected from a group comprising: capacitance; inductance; and overall antenna tuning. The overall capacitance or inductance of the circuit, or the antenna itself, and therefore the overall antenna tuning, may vary as a function of the parameter to be measured. These characteristics can be relatively easily and predictably controlled and therefore variation of those characteristics allows for a reliable and easy to use device.

It is advantageous that the measured parameter is selected from a group comprising: pressure; temperature; time; velocity; angle; length; velocity; mass; acceleration; area; volume; energy; power; and torque; any secondary parameter derived from those simple parameters; or any other primary or secondary parameter. Further parameters may be monitored and measured in accordance with the required application of the present invention.

In a preferred construction calibration data is sent from the sensor to the reader in order that the reader can interpret the frequency information sent from the sensor. The tag stores static and calibration data, which would be read at the same time as the resonant frequency is measured. The data is sent during the transmission phase of the tag, with the data being sent at a predetermined frequency that is related to the capacitance of the variable capacitor within the tag, which is itself linked to the variable parameter being measured.

In an advantageous construction, the measurement sensor is a tyre pressure sensor. Tyre pressure sensors assist with lowering the running costs of a vehicle by ensuring the correct tyre contact with the road. With the number of vehicles on roads being so high, an increase in efficiency of those vehicles can reduce the amount of exhaust gases produced and can also reduce transport costs for most consumable products.

It is preferable that the output transmitted from the sensor is encoded. The tag circuit may be adapted to incorporate an encrypting device so that the data being transmitted to the reader is encoded. This reduces the risk of the sensor being read by the wrong reader and also reduces the risk of a third party reading the information when not entitled to do so.

Advantageously, the encoded data is transmitted via a combination of the centre band frequency and a sideband frequency. In such an arrangement, the reader is configured to receive the encoded data and to decrypt it so that it can be interpreted. This further reduces the risk of interception of the information by a reader that is not meant to receive the information.

The invention uses an RFID circuit with a variable frequency to transmit information on the measurable variable parameter to a reader. The frequency may be varied as a result of a change in a component in an LC RFID tag circuit or in a similar circuit, for example an RLC circuit, the change in the component being linked to the variable parameter. The change in the component may be a direct link or an indirect link. For example, a change in pressure may be directly linked to a change in a pressure sensitive capacitor. Alternatively, the change may be a result of a change in the inductance, preferably through the use of a variable inductor or a change in the length of the inductor, perhaps linked to temperature. Information may be stored in the RFID circuit using a non-volatile memory, such that a passive RFID circuit may be used. Alternatively, an active or semi-active/semi-passive RFID tag could be used. It is preferable that a passive tag is used in order that the tag has a long life-time of use without having to be replaced or any power supply changed or charged.

The frequency range in which the tag operates can be selected according to the required use of the tag. For example, it may be desirable for the tag to be used in any frequency selected from the Low Frequency range (120 to 150 kHz), the High Frequency range, Ultrahigh Frequency range or microwave frequency range.

The invention extends to a system for measuring a parameter comprising a measurement sensor in accordance with the sensor described herein and a radio frequency reader for interrogating the sensor.

Preferably, the system comprises at least one RFID sensor and a reader that is paired with the at least one sensor. By pairing one or more sensors with one or more readers, the system can exclude other readers and sensors, thereby reducing the risk of incorrect readings from sensors that are in close proximity.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
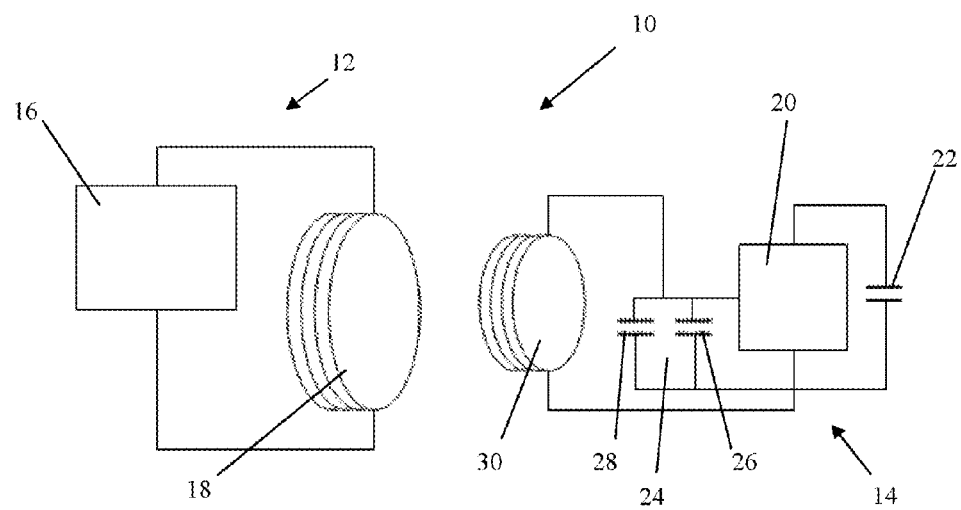
FIG. 1 is a diagram showing an example circuit for use in accordance with the present invention.

FIG. 1 shows a diagram of a pressure sensing arrangement 10 in accordance with the present invention, which uses a resonant, or LC, circuit. The arrangement 10 comprises a reader 12 and a tag 14. The reader comprises a processing unit 16 and a reader antenna coil 18.

The tag 14 comprises a chip 20 connected to a charge storage capacitor 22. The storage capacitor 22 is turn connected to a capacitor arrangement 24 of a fixed resonance capacitor 26 connected in parallel with a pressure variable capacitor 28. The capacitance of the variable capacitor 28 is linked to a measured pressure and changes in accordance with changes in that pressure. The variable capacitance of the capacitor 28 may be increased with increases in measured pressure. The capacitor arrangement 24 is subsequently connected to a tag antenna coil 30, which connects to the chip 20.

In operation, the reader 12 switches on and provides an electromagnetic field through reader antenna 18, which, due to its positioning adjacent the tag 14, provides energy to the tag 14 via the tag antenna 30 as a result of induction between the antennae 18 and 30. The generated energy is stored in the storage capacitor 22. The charging time is defined within the RFID specification.

The tag 14 resonates at a frequency which is determined by the parallel arrangement of the fixed capacitor 26 and the variable capacitor 28. The tag antenna 30 then sends out a burst of data at that frequency, containing various pieces of information, including a conversion calculation. The frequency of the signal returned to the reader 12 is determined by the inductor, L, and capacitor, C, components within the tag 14.

The reader 12 collects the data transmitted from the tag 14 via the reader antenna coil 18, and it reads the incoming data using the processor 16. The data is processed to measure the frequency transmitted from the tag 14, which is then converted into a pressure measurement using the conversion calculation which is determined by the calibration data sent by the tag 14 to the reader 12. The reader 12 is thus able to record the observed pressure sent by the tag 14 and provide a user with that information.

Figure 2:
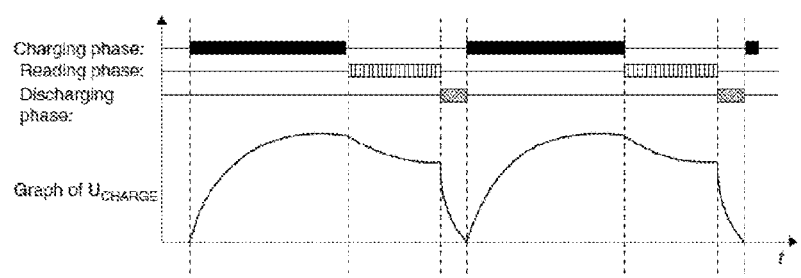
FIG. 2 is a diagram of the change in the charge according to the phase of the circuit shown in FIG. 1.

FIG. 2 shows the change in the stored energy within the tag 14 according to the phase of the interrogation of the tag 14 by the reader 12. The tag 14 integrated circuit operates in a half-duplex fashion, where the reader 12 provides energy to the device, which is stored in the storage capacitor 22 and used to power an internal oscillator within the tag 14 when transmitting. Frequency-shift key modulation is used to send data back to the reader 12 by switching a modulation capacitor in parallel with the main resonance capacitor 26.

The system of the present invention may be used to measure the pressure of a vehicle tyre. The inductor within the resonant circuit of the tag is fixed and the capacitance varies with the frequency. The capacitance is a combination of a fixed capacitance and a MEMS capacitive sensor, where the capacitance of the capacitive sensor is designed to be a function of the applied pressure, which is linked to the pressure of the tyre. The resonant circuit of low frequency tagging integrated circuit may operate in the nominal 120 kHz to 140 kHz frequency band.

The circuit may be an integrated circuit or a discrete circuit.

The tag may comprise further data to be transmitted to a reader, for example an identification number, a look-up table and/or instructions. Additionally, the tag may be passive or semi-active and may store information over a period of time. As an example, the tag may record environmental information over a period of time, such as the temperature every day for a year or every month for a decade. The data may be stored in non-volatile memory so that when the tag is later read, the tag transmits the recorded conditions to the reader. Alternatively, the information may be stored in volatile memory, which may then be lost when the power supply runs out. This may prevent information being provided to third parties should the tag be misplaced.

The tag frequency can be adjusted according to the desired situation. For example, the tag may have a frequency of around 800 MHz, or may be at any of the popular tag operating frequencies, or any available licensable frequency.

More than one variable component may be provided in the RFID circuit, thereby potentially allowing for more than one parameter to be measured with the frequency transmitted from the tag indicating that. By providing a plurality of variable components, such as variable capacitors, the frequency can be altered such that it is possible to record more than one variable parameter. Alternatively, more than one variable component may be desirable for providing a more accurate measurement of a single parameter.

It may be advantageous to modify a sideband frequency in addition to the centre frequency of the tag.

It may be desirable to apply the present invention in situations where an RLC circuit is employed, possibly with the use of a variable resistor. Alternatively, it may be desirable to use a non-tuned circuit, such as an RC circuit. The variable component of a circuit in accordance with the present invention may be a tuned resonant element, for example an antenna or aerial, which behaves similarly to a lumped coil/capacitor combination.

The invention claimed is:

1. A measurement sensor comprising a radio frequency identification (RFID) circuit for measuring a parameter, wherein the circuit comprises at least one variable component adapted to vary a characteristic of that component to reflect a change in a measured parameter, such that a frequency used by the sensor to communicate with a reader varies according to changes in the measured parameter;
wherein the measured parameter is selected from the group consisting of: pressure; temperature; time; velocity; angle; length; mass; acceleration; area; volume; energy; power; and torque; and a secondary parameter derived from one or more of the foregoing parameters; and,
wherein the variable component of the circuit is a capacitor or a coil.

2. The measurement sensor according to claim 1, wherein the variable component of the circuit is a tuned resonant element.

3. The measurement sensor according to claim 1, wherein the characteristic that changes according to the measured parameter is selected from a group comprising: capacitance; inductance; and overall antenna tuning.

4. The measurement sensor according to claim 1, wherein calibration data is sent from the sensor to the reader in order that the reader can interpret the frequency information sent from the sensor.

5. The measurement sensor according to claim 1, wherein the measurement sensor is a tyre pressure sensor.

6. The measurement sensor according to claim 1, wherein the output transmitted from the sensor is encoded data.

7. The measurement sensor according to claim 6, wherein the encoded data is transmitted via a combination of the centre band frequency and a sideband frequency.

8. A system for measuring a parameter comprising a measurement sensor according to claim 1 and a radio frequency reader for interrogating the sensor.

9. The system according to claim 8, wherein the system comprises at least one sensor according selected from the group consisting of: a sensor adapted to transmit encoded output and a sensor adapted to transmit encoded data via a combination of the centre band frequency and a sideband frequency; and a reader that is paired with the at least one sensor.

10. The measurement sensor according to claim 1, wherein the measurement sensor is a passive radio frequency identification circuit.

11. The measurement sensor according to claim 1, wherein the RFID circuit comprises a data storage means and calibration data stored therein.

12. A system comprising the measurement sensor of claim 1, wherein the system operates in a half-duplex fashion.

13. The system according to claim 12, wherein the reader provides energy to the RFID circuit, which energy is stored in a capacitor and used to power an internal oscillator within the RFID circuit when transmitting.

* * * * *